(12) United States Patent
Gromodka et al.

(10) Patent No.: US 6,695,340 B2
(45) Date of Patent: Feb. 24, 2004

(54) AIRBAG FOR A VEHICLE

(75) Inventors: Gregor Gromodka, Frankfurt (DE); Bernhard Schmidt, Maintal (DE); Volker Hofmann, Frankfurt (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 20 days.

(21) Appl. No.: 10/196,955

(22) Filed: Jul. 18, 2002

(65) Prior Publication Data
US 2003/0102656 A1 Jun. 5, 2003

(30) Foreign Application Priority Data
Nov. 30, 2001 (DE) .......................................... 101 59 046

(51) Int. Cl.[7] .............................................. B60R 21/22
(52) U.S. Cl. ................................ 280/730.1; 280/730.2; 280/728.2; 280/743.1
(58) Field of Search .......................... 280/730.1, 730.2, 280/728.2, 743.1

(56) References Cited

U.S. PATENT DOCUMENTS

| | | | |
|---|---|---|---|
| 6,158,767 A | 12/2000 | Sinnhuber | 280/730.2 |
| 6,170,860 B1 | 1/2001 | Denz et al. | 280/730.2 |
| 6,338,498 B1 | 1/2002 | Niederman et al. | 280/728.2 |
| 6,361,071 B1 | 3/2002 | Denz et al. | 280/739 |
| 6,431,587 B1 | 8/2002 | O'Docherty | 280/730.2 |
| 2001/0019201 A1 | 9/2001 | Masuda et al. | 280/730.2 |
| 2001/0045729 A1 | 11/2001 | Meuller | 280/730.2 |
| 2001/0052693 A1 | 12/2001 | Mueller | 280/730.2 |

FOREIGN PATENT DOCUMENTS

| | | |
|---|---|---|
| DE | 29709389 U1 | 11/1997 |
| DE | 19848794 A1 | 5/1999 |
| DE | 10033949 A1 | 4/2001 |
| GB | 2353254 A | 2/2001 |

Primary Examiner—Christopher P. Ellis
Assistant Examiner—Rashmi Sharma
(74) Attorney, Agent, or Firm—Lonnie Drayer; Jarett Rieger

(57) ABSTRACT

An airbag for a vehicle is constructed to be arranged in the region of the vehicle roof and has at least one inflatable chamber. The arrangement of the airbag is above securing portions which extend from the inflatable chamber upwards in the direction of the vehicle roof, with the securing portions having inflatable regions.

5 Claims, 1 Drawing Sheet

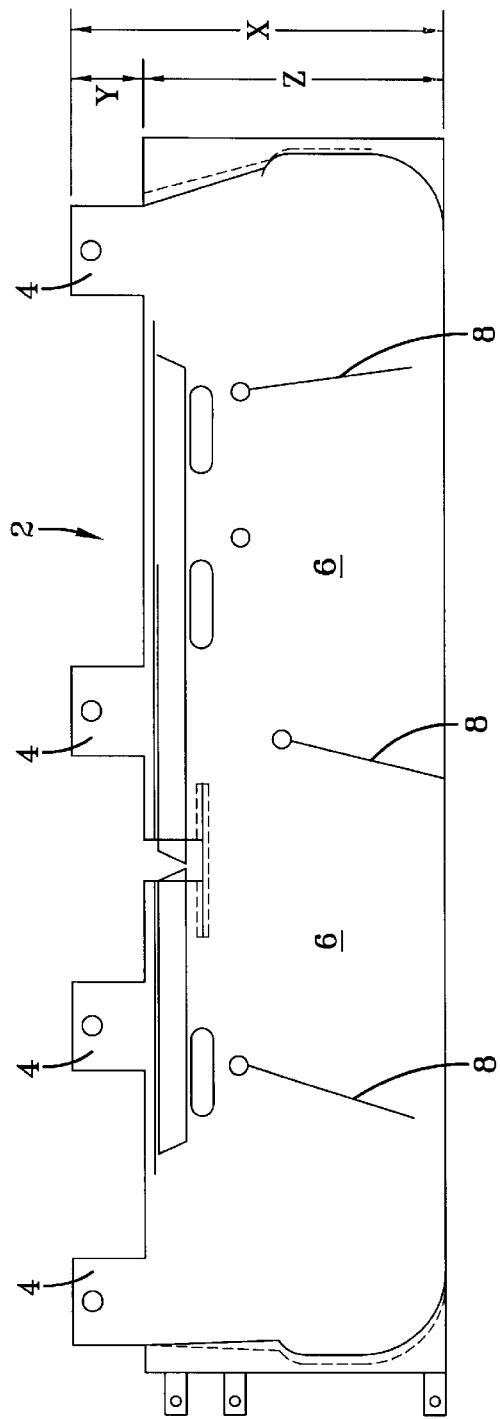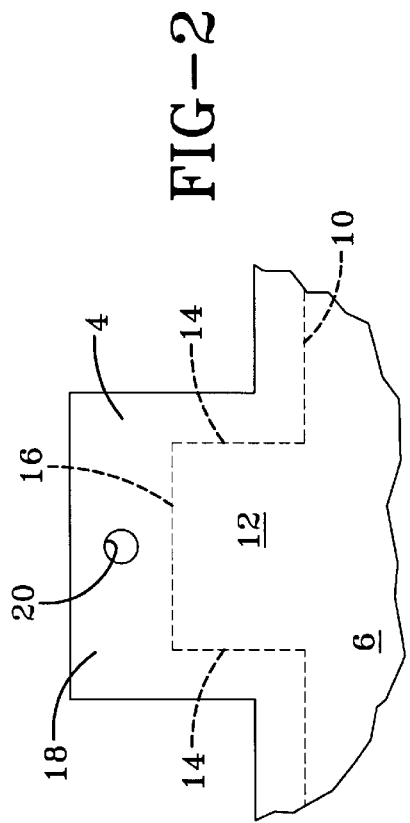

AIRBAG FOR A VEHICLE

FIELD OF THE INVENTION

The present invention relates to an airbag for a vehicle.

BACKGROUND OF THE INVENTION

Airbags that are intended to protect the heads of the vehicle occupants in a lateral impact are designated as head side airbags or curtain airbags, and are arranged in the region of the vehicle roof. If an airbag of this kind deploys, the chamber or chambers of the airbag is/are filled with gas, as a result of which the airbag emerges from the vehicle roof to protect the vehicle occupants in the lateral regions of the vehicle. In this context, an airbag of this kind is constructed such that the gas-filled chambers lie as closely as possible next to the side structure of the vehicle, that is to say for example in the region of the side window. In addition, it is also necessary, when the airbag is in the inflated condition, for the chamber or chambers to be located at those points in the vehicle interior at which protection is intended to be provided. Consequently, on the one hand the intention is to prevent the entire airbag from moving into the interior, away from the side structure of the vehicle, to prevent body parts of persons in the vehicle from coming between the airbag and the corresponding side structure of the vehicle. On the other hand, the gas-filled chambers of the airbag must be arranged where protection is required, as far as their vertical position is concerned. As a result, the chambers of the airbag must not be arranged too low in the vehicle nor arranged too high up.

It is known to secure so-called side airbags in the region of the vehicle roof, in particular in the region between the vehicle roof and the lateral region of the vehicle, by securing tabs arranged on the airbag. Typically, in this context, a plurality of tabs lying one behind the other as seen in the direction of the vehicle are used, and may be constructed for example with holes which ultimately serve to arrange the airbag on the vehicle body.

It has now been found that inflating the chamber or chambers of the airbag gives the airbag a tendency to move in the direction of the vehicle roof, that is to say to adopt a position which is undesirable, and hence leaves a region of the vehicle side structure unprotected at the downwardly directed free end. There is furthermore a tendency for the airbag to swing into the vehicle interior.

There is provided in accordance with one aspect of the present invention an airbag which is constructed such that on the one hand moving away from the region to be protected is prevented and on the other hand a desired vertical position of the airbag can be achieved with optimum material savings.

The fundamental idea of the inventive construction of the airbag resides in constructing the securing portions which are used to secure the airbag in the region of the vehicle roof or roof arch, and which may also be called tabs, such that these have inflatable regions. The inflatable regions in the securing portions or tabs on the one hand ensure additional stability of the airbag in the vertical direction, so that the airbag or the chamber of the airbag is prevented from drifting upwards on inflation, which was hitherto the case, since the tabs used have no stability of themselves. In other words, the airbag or the upwardly directed end regions of the chambers of the airbag are prevented from extending too far upwards and hence exposing a lower, unprotected region. On the other hand, the inflatable regions in the securing portions also produce stability in the horizontal direction, as a result of which the tendency of the airbag to move into the vehicle interior, in other words to perform a rotary movement about the securing means, is greatly reduced. Moreover, and advantageously, a minimum required volume of the chamber or chambers of the airbag can be maintained. It is accordingly not necessary to construct the chambers to be more voluminous in order to obtain the effect that the lower marginal regions of the chambers extend further down in the inflated condition. This results in a not inconsiderable saving on material. While maintaining the hitherto conventional volume of the chamber or chambers of an airbag module arranged laterally on the vehicle, it is consequently possible to achieve the desired vertical position, and at the same time it is possible to prevent the airbag having a tendency to move towards the interior.

It can be seen that maintaining a side airbag in the desired location cannot be achieved simply by constructing the securing means or tabs to be longer, since the airbag, in dependence on the opening pulse, that is to say when the chambers inflate, on the one hand has a tendency to roll over, that is to say to swing upwards and hence away from the side region of the vehicle. Moreover, simply lengthening the securing means would not be able to prevent the further tendency of the airbag to push itself back under the roof lining on inflation and hence to upwardly displace its horizontal position in an undesirable manner. By constructing the securing means with inflatable regions, pillar-like regions are created which prevent the tendencies mentioned above.

In an advantageous embodiment, the securing portions having the inflatable regions are formed from the material of the airbag and are connected in one piece thereto. It is thus possible to attain the desired shaping of the airbag already at the time of manufacturing the airbag, with minimal additional use of material. Moreover, the fact that the securing portions are in one piece with the material of the airbag ensures that they cannot become detached from the rest of the airbag, with the result that the airbag does not tear away from the securing means as a result of the opening pulse.

Expediently, the inflatable regions of the securing means project, as seen from the chamber, into the securing portions and moreover have a marginal region adjoining the latter and facing the free ends of the securing portions. The marginal region which is arranged at the free ends of the securing portions, and is also capable of being provided in the lateral region of the securing portions as well, ensures among other things that the inflatable regions are sufficiently protected from undesirable tearing open.

Advantageously, devices for arranging the airbag on the vehicle body are constructed in the marginal region of the securing means, expediently in the region of the free ends of the securing means. These may for example be openings through which the corresponding securing means reach to securely arrange the airbag on the vehicle body.

BRIEF DESCRIPTION OF THE DRAWINGS

FIG. 1 shows a plan view of an airbag according to the invention.

FIG. 2 shows a securing portion of the airbag according to the invention, as a detail.

DETAILED DESCRIPTION OF THE INVENTION

FIG. 1 shows an airbag 2 according to the invention, in a spread-out but not inflated condition. The airbag 2 has in its upper region, in the installed condition facing a vehicle roof, four securing portions 4. Below the securing portions 4 are arranged the chambers 6 of the airbag 2, which are separated from one another by delimiting stitching lines 8, so that when the airbag deploys chambers 6 (in the case shown, four chambers 6) are formed.

In the assembled condition, the airbag 2 is secured by way of the securing portions 4 to the vehicle in the region of the vehicle roof, with the region of the airbag 2 adjoining the securing portions being folded together and arranged concealed in the vehicle roof liner. When this airbag 2, which is also designated a head side airbag or curtain airbag, is activated gas is introduced in known manner into the chambers 6 by a gas generator. The airbag 2 breaks through the vehicle roof liner and extends downwards in the region of the side structure of a vehicle to protect the vehicle occupants in this region.

The total height of the airbag 2 produced in the spread-out condition is designated X in FIG. 1, and the longitudinal extent of the securing portions, from the chambers 6 in the direction of the free end of the securing portions 4, is designated Y. The extent of the airbag 2 vertically, which results from the difference between the lengths X and Y, is designated Z.

FIG. 2 shows a securing portion 4 as a detail, with the chamber or chambers 6 of the airbag adjoining it in the lower region. The dotted line 10 extending horizontally in the lower region in FIG. 2 indicates the end region of a chamber 6, directed upwards towards the vehicle roof. In the region of the securing portion 4 extending in the direction of the vehicle roof, a type of additional chamber is provided in the form of an inflatable region 12. The lateral extent of the inflatable region 12 is also indicated by dotted lines 14, but extending vertically. The upper portion or end of the inflatable region 12 is again indicated by a dotted line 16. As can be seen, the region of the chamber 6 and the inflatable region 12 merge into one another, as a result of which a chamber having a lug extending upwards to the vehicle roof is formed.

When the airbag is deployed, the inflatable region 12 ensures, because it too is inflated, that pillar-like support elements are created in the region of the securing portion 4. This pillar-like support region makes the position of the airbag in the deployed condition more rigid, that is to say it prevents the end region of the airbag directed upwards towards the car roof from shifting below the vehicle roof when the airbag deploys, as a result of which the overall position of the airbag, that is to say the position of the chamber 6, would be displaced upwards in undesirable manner.

At the same time, the inflatable securing portion 12 represents a means of rigidifying that prevents the airbag as a whole from pivoting or swinging into the vehicle interior.

Adjoining the upper end of the inflatable region 12, that is to say above the horizontally extending dotted line 16, is a marginal region 18 which is constructed for the purpose of arranging the securing portion 4 on the vehicle body, here in the form of an opening 20. It should be understood here that the marginal region 18 is not inflated. Constructed adjoining the marginal region 18 are further marginal regions which extend vertically downwards and in turn merge into horizontal marginal regions which are arranged above the chamber 6. The marginal regions are consequently presented in FIG. 2 as the regions extending between the dotted line and the upper termination (solid line).

It is clear from FIG. 1 that by varying the longitudinal extent Y of the securing portions the position of the chambers 6 may be varied, by making the securing portions either longer or shorter, but in all cases having the inflatable regions 12. This makes it possible to vary the vertical position of the chambers 6 in the vehicle interior in a simple way without it being necessary at the same time to alter the other dimensions of the airbag, that is to say among other things the vertical extent z of the chambers 6.

To construct the inflatable regions of the securing portions independently of the chamber or chambers of the airbag, it may also be expedient to construct the inflatable regions independently of the chambers, in order for example to ensure that the inflatable regions, which are substantially smaller in volume than the actual chambers of the airbag, first of all inflate fully before the chambers of the airbag fill, in order thus to form the pillar-like supports before complete filling of the airbag, which is even more effective in countering the tendency of the airbag to move undesirably upwards and inwards into the vehicle interior.

Particularly advantageously, it is possible while maintaining the other dimensions of the airbag, that is to say the lengths of its external extent and the volume of the chamber or chambers, to determine the position of the chambers in the vehicle interior by making the length of the securing portions, that is to say their extent from the chambers of the airbag to the free end of the securing portions, and/or their width, flexible. It is thus possible to use an airbag which is identical in its basic dimensions for different types of vehicle, in which case all that needs to be done is to make the dimensions of the securing portions in a manner corresponding to the respective vehicle type. This is particularly advantageous with regard to the mass production of such airbags, because the basic blanks of the airbag material can remain identical.

Expediently, for each individual airbag a plurality of the securing portions according to the invention is provided, that is to say a plurality of securing portions provided in the direction of travel of the vehicle is arranged on the airbag.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

We claim:

1. An airbag for a vehicle, which is constructed to be arranged in the region of a vehicle roof or roof arch comprising at least one inflatable chamber being filled by gas and securing portions being finger-like projections extending from the inflatable chamber upwards in the direction of the vehicle roof, the securing portions are formed from a material of the airbag and are connected in one piece thereto, wherein each securing portion comprises an inflatable region and a marginal region, wherein the marginal region wraps around three outer surfaces of the inflatable region.

2. The airbag for a vehicle according to claim 1, wherein the marginal region has a device for arranging the airbag on the vehicle.

3. The airbag for a vehicle according to claim 1, wherein the inflatable region extends into the securing portion approximately half a longitudinal extent of the securing portion.

4. The airbag for a vehicle according to claim 3, wherein the inflatable region occupies over half a width of the securing portion wherein the width of the securing portion is a dimension of the securing portion perpendicular with the longitudinal extent of the securing portion.

5. The airbag for a vehicle according to claim 2, wherein the marginal region defines an opening for attaching the securing portion of the airbag to a vehicle body.

* * * * *